United States Patent [19]

Leisner et al.

[11] Patent Number: 4,718,543
[45] Date of Patent: Jan. 12, 1988

[54] CHAIN CONVEYOR FOR WORKPIECES AND WORKPIECE CARRIERS

[75] Inventors: Ernst Leisner, Ditzingen; Gernot Maier, Stuttgart; Peter Rothfuss, Ditzingen, all of Fed. Rep. of Germany

[73] Assignee: Robert Bosch GmbH, Stuttgart, Fed. Rep. of Germany

[21] Appl. No.: 897,761

[22] PCT Filed: Sep. 11, 1985

[86] PCT No.: PCT/DE85/00318
§ 371 Date: Jun. 23, 1986
§ 102(e) Date: Jun. 23, 1986

[87] PCT Pub. No.: WO86/02622
PCT Pub. Date: May 9, 1986

[30] Foreign Application Priority Data

Oct. 23, 1984 [DE] Fed. Rep. of Germany ....... 3438786

[51] Int. Cl.⁴ ............................................. B65G 39/20
[52] U.S. Cl. ...................................... 198/779; 24/555; 198/803.01
[58] Field of Search ................... 198/779, 803.01, 841, 198/838; 24/555

[56] References Cited

U.S. PATENT DOCUMENTS

| | | | |
|---|---|---|---|
| 1,845,268 | 2/1932 | Harvey | 24/555 |
| 2,895,589 | 7/1959 | Rostron | 198/779 |
| 3,197,020 | 7/1965 | Evans | 198/779 |
| 3,206,004 | 9/1965 | Lyman | 198/803.01 |
| 3,701,413 | 10/1972 | Leahy et al. | 198/779 |
| 3,878,735 | 4/1975 | Preuss | 198/838 |
| 4,582,193 | 4/1986 | Larsson | 198/803.01 |

FOREIGN PATENT DOCUMENTS

| | | | |
|---|---|---|---|
| 8227706 | 2/1983 | Fed. Rep. of Germany | 198/779 |
| 5957 | of 1886 | United Kingdom | 24/555 |
| 1155248 | 6/1969 | United Kingdom | 198/779 |
| 609683 | 5/1978 | U.S.S.R. | 198/803.01 |
| 1046164 | 10/1983 | U.S.S.R. | 198/803.01 |

Primary Examiner—Richard E. Moore
Assistant Examiner—Eric K. Nicholson
Attorney, Agent, or Firm—Michael J. Striker

[57] ABSTRACT

Chain conveyor for workpieces and workpiece carriers with a roller chain (18) which includes a roller (28) at every second link joint. Spring elements (36), which cover the free spaces between the rollers (28) towards the top, are caught on hinge pins (24) lying between the rollers (28). Chips, screws or the like small parts are thereby prevented from reaching the free spaces between the rollers (28) and damaging the support surfaces of stopped workpieces or workpiece carriers.

11 Claims, 4 Drawing Figures

CHAIN CONVEYOR FOR WORKPIECES AND WORKPIECE CARRIERS

FIELD OF THE INVENTION

The invention relates generally to chain conveyors for work pieces.

BACKGROUND OF THE INVENTION

Chain conveyors are suitable for transporting heavy workpieces and have the advantage that the chain can continue to run when workpieces or workpiece carriers are stopped. In so doing, rollers roll at the supporting surface of the workpiece or workpiece carrier so that only rolling friction occurs during the relative movement of the parts, and only a relatively limited drive power is necessary for the continued movement of the chain. It is disadvantageous in such chain conveyors that chips, screws and similar small parts, which, when the workpiece is stopped but the chain continues to run, can damage the supporting surface of the workpiece or of the workpiece carrier and fall into the wedgelike frame spaces in the chain which are formed between the rollers.

SUMMARY OF THE INVENTION

It is an object of the invention that the free spaces in the chain formed between its rollers are covered towards the top in the working area so that small pieces can no longer fall there between the rollers and chain links.

It is another object to provide a construction which is easy to assemble results when insert elements are formed by means of spring elements which are caught on the hinge pins lying between the rollers.

A particularly effective covering of the free spaces in the chain can be achieved by means of a flat web.

A simple construction results when the spring elements, according to another embodiment are formed by means of resilient sheet metal stirrups in one piece.

In another embodiment of the invention the free ends of the resilient sides of the insert elements are lengthened beyond their pressing surfaces lying against the hinge pin. The free ends are formed in such a way that they exert a restoring force which returns the insert element to the catching position when, during a curving of the chain and a shortening of the roller spacing caused by it, the rollers press the spring element some distance out of the catching position.

Accordingly, it is possible also to curve the chain around an axis lying on the side of the inserted insert element as is necessary in chain conveyors with a tensioning mechanism for the chain.

The covering of the roller chain can be further improved on when the chain guiding section is provided at the head side with cover strips which reach to a gap at the rollers corresponding to the necessary movement play of the rollers.

BRIEF DESCRIPTION OF THE DRAWINGS

An embodiment of the invention is shown in the drawing and explained in more detail in the following description.

DETAILED DESCRIPTION OF THE PREFERRED EMBODIMENTS

Figure 1:
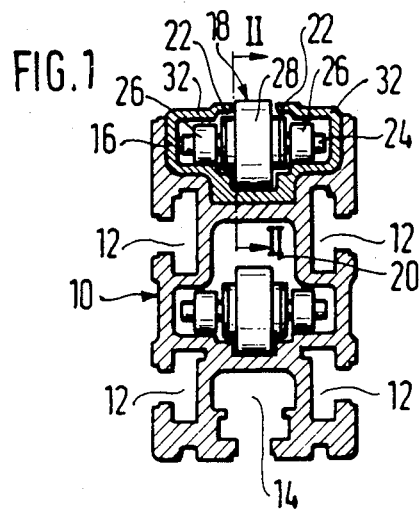
FIG. 1 shows a cross section through a chain conveyor, according to the invention, for flexible assembly systems.

The chain conveyor has a supporting section 10 which is provided with longitudinal grooves 12, 14 for insertion of connecting means for additional supporting sections, which together form the framework of a transfer system. A chain guiding section 16, in which the conveying line of an endless roller chain 18 is guided and supported, is inserted into the supporting section 10 from above. This roller chain 18 is guided, in a known manner, via two deflection rollers at the ends of the conveying length and via two tension rollers, wherein one tension roller deflects and curves the chain in a different manner than the deflection rollers and the other tension roller. The chain line leading from the one deflection roller to the tension roller, which latter curves the chain 18 in the opposite direction, extends in a hollow space 20 of the supporting section 10. The upper roller 28 of FIG. 1 is for conveying while the lower roller is for return.

Figure 2:
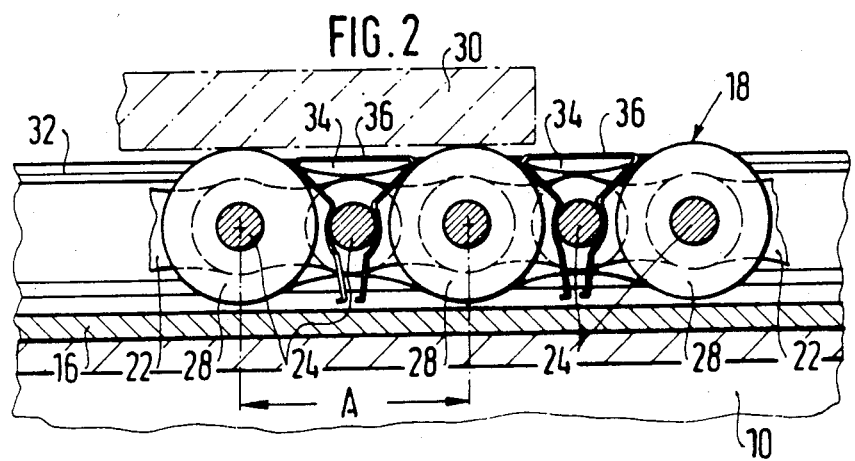
FIG. 2 shows a partial section, according to line II—II in FIG. 1, in enlarged scale.

The chain 18 is provided at both sides of its longitudinal center plane with bracket-shaped chain links 22, which are connected with one another by means of hinge pins 24. The end areas of the hinge pins 24 are provided with running rollers 26 which contact running surfaces of the chain guiding section 16. Every second hinge pin 24 carries a conveyor roller 28 so as to be freely rotatable between the chain links, the roller 28 forming a point of support for a workpiece carrier 30 indicated in FIG. 2. The chain guiding section 16 is provided on its head side with cover strips 32 which extend up to a slight gap for the conveyor rollers 28. The cover strips 32 lie somewhat below the transport plane tangential to the rollers 28 so that the material to be transported can pass without hindrance.

Figure 3:
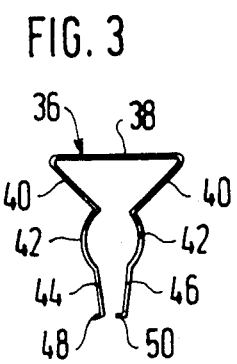
FIG. 3 shows an individual part of the damming roller chain according to FIG. 2.

Wedgelike free spaces 34 are formed in the chain 18 between the rollers 28. Free spaces 34 are covered, according to the invention, at the chain side carrying the material to be transported, by means of insert elements 36 which are supported by the hinge pins 24 lying between the rollers 28. The insert elements 36 are formed of one-piece resilient plate which are caught on the assigned hinge pins 24. Every insert element 36 has a somewhat flat web 38 (FIG. 3) and two resilient sides, each of which comprises a first side portion 40, which extends approximately tangentially relative to the adjoining roller 28. Every insert element 36 also has a second side portion 42 which is connected to the first side portion 40 and is formed to accomodate the hinge pin 24 therebetween. The free side ends 44 and 46 are lengthened beyond the pressing surfaces at the side portions 42 and are positioned so as to be inclined relative to one another. The side end 44 is provided with an outwardly bent edge 48, which facilitates the attachment of the insert element 36 on the hinge pin 24. The other side end 46 has an inwardly directed edge 50 which serves as a securing means against undesired detachment of the insert element 36.

Figure 4:
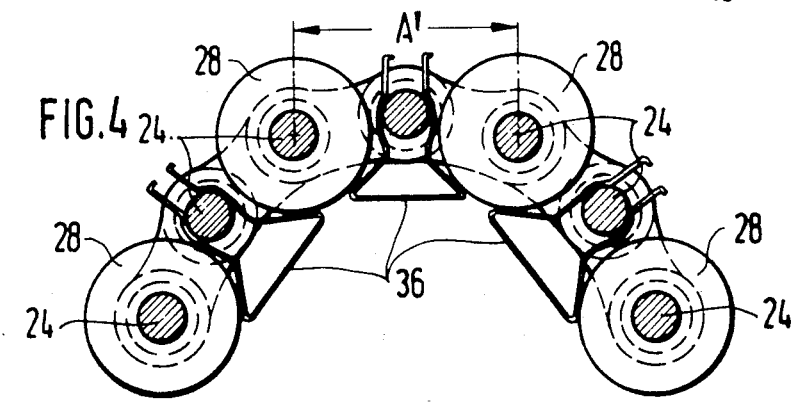
FIG. 4 shows the, roller chain, according to FIG. 2, in a curvature area.

During assembly, the insert elements 36 are simply pressed on the free hinge pins 24 until they catch with the hinge pins 24. The free spaces are then covered toward the outside so that no chips, screws or other small parts can fall into them. The insert elements 36 are held between the conveyor rollers 28 so as to be centered by means of their side portions 40. During curving of the chain 18, according to FIG. 4, the normal roller distances A are reduced to distances A'. The insert elements 36 are accordingly pressed together axially and pressed out a distance from their catching position. When the curved chain portion passes into the stretched out position again, the insert elements 36 are pushed back into the catching position by means of the returning force of the diagonally positioned side ends 44, 46.

We claim:

1. A chain conveyor for workpieces and workpiece carriers, comprising:

guiding means;
   a roller chain guidable by said guiding means and including a plurality of rollers spaced apart from one another, a plurality of side and intermediate hinge pins arranged so that two of said side hinge pins rotatable support two of said rollers located between said neighboring two rollers, and a plurality of link joints each connecting two of said side hinge pins neighboring each other, said rollers being arranged so that a free space remains between said neighboring two rollers, said roller chain having a side facing toward said workpieces and workpiece carriers to be transported; and
   means for preventing chips, screws and other small parts from entering said free space from said side and including an insert element arranged between said neigboring two rollers and engagably supported by said one of said intermediate hinge pins located between said neighboring two rollers, said insert element being composed of resilient material so as to form at least one spring element, said spring element being catchable around said one of said intermediate hinge pins because of said resilient material, said spring element having a flat web portion and two side portions resilient relative to each other, each of said side portions extending from said flat web portion and arranged between said two neighboring rollers such that each of said side portions is closest to a respective one of said two neighboring rollers, each of said side portions having a first part extending tangentially relative to said respective one of said two neighboring rollers and having a second part extending from said first part, said second part of each of said side portions being formed and arranged so that said one of said intermediate hinge pins is catchable and embracable between both of said second parts, said second part having a respective pressing surface which is pressable against said one of said intermediate hinge pins when in a catch position, each of said side portions of said spring element also having a free end part extending from said respective pressing surface, said free end parts being formed to resiliently exert a restoring force which returns said spring element to said catch position when a predetermined distance between said two neighboring rollers is restored after having been shortened when said roller chain experiences a curvature such that said two neighboring rollers are pressed against said spring element to move said spring element out of said catch position.

2. A chain conveyor as defined in claim 1, wherein said roller chain also includes another plurality of link joints spaced away from said first mentioned plurality of link joints and each also connecting said neighboring two hinge pins.

3. A chain conveyor as defined in claim 1, characterized in that said one of said intermediate hinge pins has a diameter, said second portions being formed to conform to said diameter.

4. A chain conveyor as defined in claim 1, characterized in that said spring element is composed of a resilient plate forming a one-piece structure.

5. A chain conveyor as defined in claim 1, characterized in that at least one of said free end parts has a bent section, said bent section being formed to prevent a complete release of said spring element from said one of said intermediate hinge pins when said roller chain experiences a curvature.

6. A chain conveyor as defined in claim 5, characterized in that another one of said free end parts has a second bent section, said second bent section facilitating a catching of said spring element on said one of said intermediate hinge pins.

7. A chain conveyor as defined in claim 6, characterized in that said bent section of said one free end part bends toward said another one of said free end parts and said second bent section bends outward away from said one free end part.

8. A chain conveyor as defined in claim 1, characterized in that each of said rollers projects above said guiding means for supporting said workpieces and workpiece carriers to be transported.

9. A chain conveyor as defined in claim 8, characterized in that said chain guiding means has a head side facing toward said workpieces and workpiece carriers to be transported, said chain guiding means also including at least one cover strip on said head side, said rollers being formed to have a portion extending beyond said cover strip from said head side, said rollers and said cover strip being spaced from each other so as to provide clearance therebetween.

10. A chain conveyor as defined in claim 1, characterized in that said guiding means includes a supporting element having at least one side, said one side having at least one longitudinal projecting surface and at least one longitudinal groove, said projecting surface and said groove conforming in shape to each other such that an additional identically shaped support element is interlockable with said groove and said projecting surface.

11. The chain conveyor as defined in claim 1, wherein said free end part of each of said side portions of said insert element are formed to incline closer to each other away from said respective pressing surface.

* * * * *